(12) United States Patent
Yu et al.

(10) Patent No.: US 10,227,938 B2
(45) Date of Patent: Mar. 12, 2019

(54) METHOD AND SYSTEM FOR CONTROLLING SUPERCHARGER OF VEHICLE

(71) Applicant: HYUNDAI MOTOR COMPANY, Seoul (KR)

(72) Inventors: Seung Eun Yu, Seoul (KR); Hyo Sang Cho, Suwon-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 202 days.

(21) Appl. No.: 15/343,628

(22) Filed: Nov. 4, 2016

(65) Prior Publication Data

US 2018/0010533 A1 Jan. 11, 2018

(30) Foreign Application Priority Data

Jul. 6, 2016 (KR) .................. 10-2016-0085663

(51) Int. Cl.
| | |
|---|---|
| *F02D 41/00* | (2006.01) |
| *F02B 33/40* | (2006.01) |
| *F02D 41/18* | (2006.01) |
| *F02B 39/10* | (2006.01) |
| *F02B 37/04* | (2006.01) |

(52) U.S. Cl.
CPC .......... *F02D 41/0007* (2013.01); *F02B 33/40* (2013.01); *F02B 37/04* (2013.01); *F02B 39/10* (2013.01); *F02D 41/0077* (2013.01); *F02D 41/0087* (2013.01); *F02D 41/18* (2013.01);
(Continued)

(58) Field of Classification Search
CPC ............. F02D 41/0007; F02D 41/0087; F02D 41/0077; F02D 2200/0411; F02D 2200/101; F02D 41/00; F02B 33/40
See application file for complete search history.

(56) References Cited

U.S. PATENT DOCUMENTS

| | | | |
|---|---|---|---|
| 2015/0204279 A1* | 7/2015 | Kemmerling | ....... F02D 41/0087 123/568.11 |
| 2017/0159580 A1* | 6/2017 | Han | ........................ F02D 17/02 |

(Continued)

FOREIGN PATENT DOCUMENTS

| | | | | |
|---|---|---|---|---|
| EP | 3059426 A1 * | 8/2016 | ............. | F02B 37/10 |
| FR | 3058472 A1 * | 5/2018 | | |

(Continued)

*Primary Examiner* — Patrick Maines
(74) *Attorney, Agent, or Firm* — Morgan Lewis & Bockius LLP

(57) ABSTRACT

A method for controlling a supercharger of a vehicle includes: determining, at a first determination step, whether or not an engine operates in a cylinder deactivation (CDA) mode; calculating, at a second determination step, a difference value between a target boost pressure of a turbocharger and a current boost pressure of intake air boosted by the turbocharger, and determining whether or not the difference value is equal to or greater than a reference difference value; determining, at a third determination step, based on a current operating condition of the engine whether or not the supercharger is allowed to operate; determining, at a fourth determination step, a target rpm of the supercharger, and determining whether or not the target rpm is equal to or greater than a reference rpm; and operating the supercharger at an operating step.

6 Claims, 2 Drawing Sheets

(52) U.S. Cl.
CPC .... *F02D 41/005* (2013.01); *F02D 2200/0411* (2013.01); *F02D 2200/101* (2013.01)

(56) References Cited

U.S. PATENT DOCUMENTS

| | | | |
|---|---|---|---|
| 2017/0159581 A1* | 6/2017 | McCarthy, Jr. | F02B 37/04 |
| 2017/0292440 A1* | 10/2017 | Cho | F02B 33/44 |
| 2018/0051642 A1* | 2/2018 | Park | F02B 37/10 |
| 2018/0058289 A1* | 3/2018 | Lee | B01D 53/9495 |
| 2018/0163616 A1* | 6/2018 | Han | F02B 29/0412 |

FOREIGN PATENT DOCUMENTS

| | | | | |
|---|---|---|---|---|
| JP | 2005291020 A | * | 10/2005 | |
| JP | 4389799 B2 | | 12/2009 | |
| JP | 2013-231412 A | | 11/2013 | |
| JP | 2016-050535 A | | 4/2016 | |
| KR | 10-2012-0063408 A | | 6/2012 | |
| KR | 10-2012-0126209 A | | 11/2012 | |
| KR | 10-2013-0003115 A | | 1/2013 | |
| KR | 10-2014-0131642 A | | 11/2014 | |
| KR | 10-1601157 B1 | | 3/2016 | |
| WO | WO 2014033054 A1 | * | 3/2014 | ......... F02D 41/0087 |

* cited by examiner

METHOD AND SYSTEM FOR CONTROLLING SUPERCHARGER OF VEHICLE

CROSS REFERENCE TO RELATED APPLICATION

The present application claims the benefit of priority to Korean Patent Application No. 10-2016-0085663, filed on Jul. 6, 2016, the entire content of which is incorporated herein for all purposes by this reference.

TECHNICAL FIELD

The present disclosure relates to a supercharger of a vehicle, and more particularly, to an electric supercharger boosting a pressure of intake air flowing into an engine.

BACKGROUND

Generally, a cylinder deactivation (CDA) technology is applied to a vehicle engine to improve fuel efficiency thereof. When the engine operates in a CDA mode, fuel injection into some of cylinders provided in the engine stops, and thus, only the remaining cylinders are used to operate the engine.

The CDA technology is used during light-load operation of the vehicle, such as high-speed running, etc. Therefore, in comparison with a normal operating condition of the engine, in the CDA mode, fuel consumption decreases such that the fuel efficiency increases. However, the volume or pressure of exhaust gas decreases such that it is possible to have an effect on a driving condition of a turbocharger or on a re-circulated exhaust gas volume by an exhaust gas recirculation (EGR) system, etc. Therefore, it is important to boost an intake air pressure with the turbocharger, etc. normally, even though the engine operates in the CDA mode.

The foregoing is intended merely to aid in the understanding of the background of the present disclosure, and is not intended to mean that the present invention falls within the purview of the related art that is already known to those skilled in the art.

SUMMARY

The present disclosure has been made keeping in mind the above problems occurring in the related art, and the present disclosure is intended to propose a method and a system for controlling a supercharger of a vehicle, the method effectively boosting the intake air pressure with a turbocharger even though an engine operates in a CDA mode, thereby effectively preventing the re-circulated exhaust gas volume from decreasing.

According to an embodiment in the present disclosure, a method of controlling a supercharger of a vehicle includes: determining, by a controller at a first determination step, whether or not an engine operates in a cylinder deactivation (CDA) mode; calculating, by the controller at a second determination step, a difference value between a target boost pressure of a turbocharger based on a current running condition of the vehicle and a current boost pressure of intake air boosted by the turbocharger, and determining whether or not the difference value is equal to or greater than a reference difference value, when the engine operates in the CDA mode; determining, by the controller at a third determination step, based on a current operating condition of the engine whether or not the supercharger is allowed to operate, when the difference value is equal to or greater than the reference difference value; determining, by the controller at a fourth determination step, a target rpm of the supercharger, and determining whether or not the target rpm is equal to or greater than a reference rpm, when determining the supercharger is allowed to operate; and operating the supercharger based on the target rpm when the target rpm is equal to or greater than the reference rpm.

In the second determination step, the controller may determine the target boost pressure based on a desired engine rpm and a desired intake air volume.

In the third determination step, the controller may determine based on the current operating condition of the engine, whether or not the supercharger is allowed to operate, by using both a current intake air volume and a limited rpm of the supercharger.

In the fourth determination step, the controller may determine the target rpm of the supercharger based on an intake air pressure, a current intake air volume of the supercharger, and the difference value between the target boost pressure and the current boost pressure of intake air boosted by the turbocharger.

After the first determination step, the method may include increasing, by the controller, an opening ratio of an exhaust gas recirculation (EGR) valve from a preset value when the engine operates in the CDA mode.

According to another embodiment in the present disclosure, a system for controlling a supercharger of a vehicle includes: a turbocharger provided on an intake air flow line of an engine, and boosting pressure of intake air flowing into the engine; the supercharger provided on the intake air flow line at a location in a downstream of the turbocharger, and boosting the pressure of intake air flowing into the engine as an option; and a controller determining whether or not the engine operates in a cylinder deactivation (CDA) mode; calculating a difference value between a target boost pressure of the turbocharger based on a current running condition of the vehicle and a current boost pressure of intake air boosted by the turbocharger, and determining whether or not the difference value is equal to or greater than a reference difference value, when the engine operates in the CDA mode; determining based on a current operating condition of the engine, whether or not the supercharger is allowed to operate, when the difference value is equal to or greater than the reference difference value; determining a target rpm of the supercharger, and determining whether or not the target rpm is equal to or greater than a reference rpm, when determining the supercharger is allowed to operate; and operating the supercharger based on the target rpm when the target rpm is equal to or greater than the reference rpm.

According to the method and system for controlling the supercharger of the vehicle as described above, it is possible to effectively boost the intake air pressure with the turbocharger even though the engine operates in the CDA mode, thereby effectively preventing the re-circulated exhaust gas volume from decreasing.

In particular, in the CDA mode of the engine, when the difference value between the target boost pressure of the turbocharger and the current boost pressure of intake air boosted by the turbocharger is equal to or greater than the reference difference value, the controller operates the supercharger. Therefore, a decrease in the exhaust gas pressure is avoided, thereby preventing the boost pressure of the intake air from decreasing.

In addition, when the difference value is equal to or greater than the reference difference value, the controller determines based on the current operating condition of the engine whether or not the supercharger is allowed to operate. Therefore, the control method and system can effectively operate the supercharger.

Based on the current operating condition of the engine, when determining the super charger is allowed to operate, the controller determines the target rpm of the supercharger, and determines whether or not the target rpm is equal to or greater than the reference rpm. Therefore, it is possible to effectively control the supercharger by determining whether or not the supercharger can effectively boost the intake air pressure.

BRIEF DESCRIPTION OF THE DRAWINGS

The above and other objects, features and other advantages of the present disclosure will be more clearly understood from the following detailed description when taken in conjunction with the accompanying drawings, in which.

DETAILED DESCRIPTION

Hereinbelow, exemplary embodiments will be described in detail with reference to the accompanying drawings.

Figure 1:
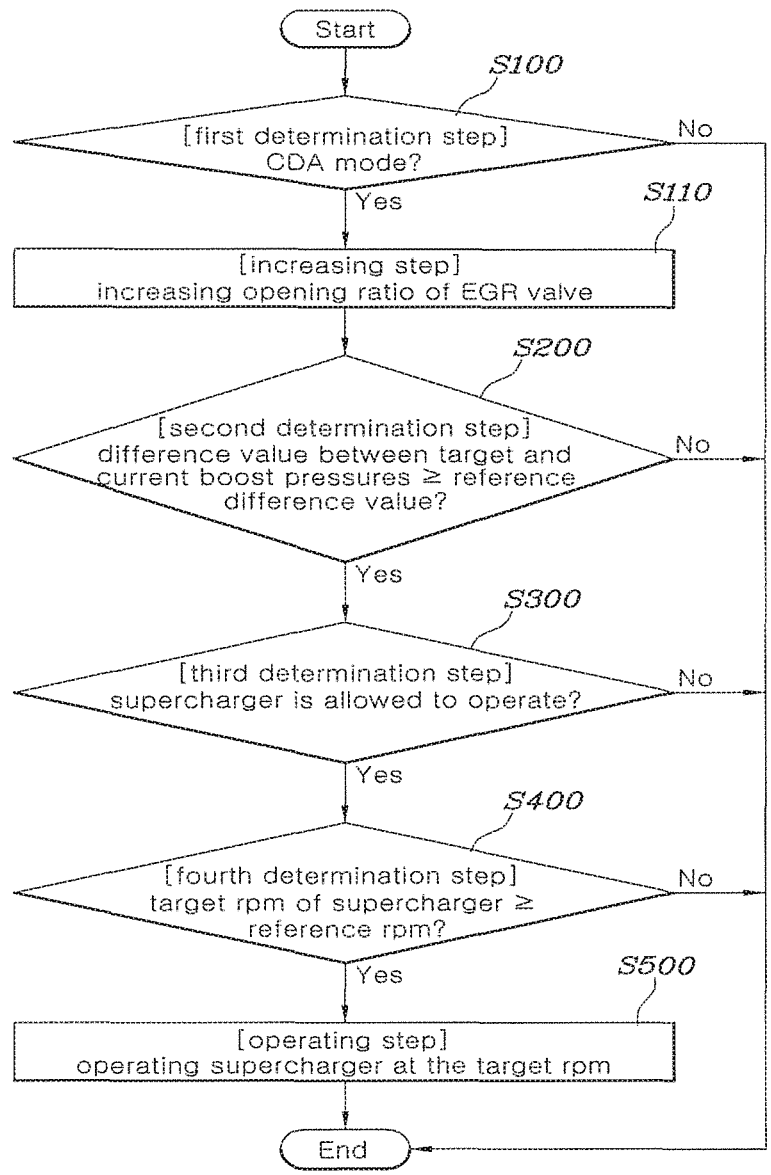
FIG. 1 is a flowchart showing a method of controlling a supercharger of a vehicle according to an exemplary embodiment in the present disclosure.
Figure 2:
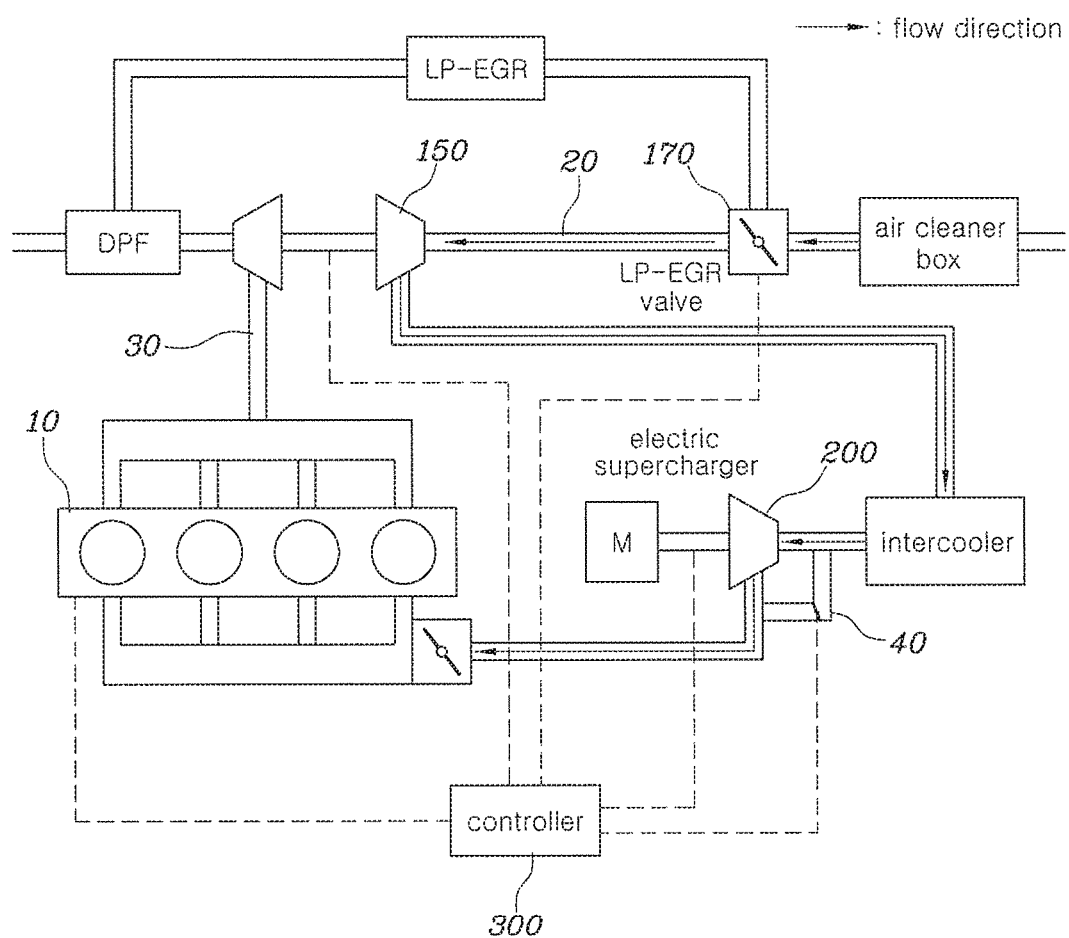
FIG. 2 is a view showing a system for controlling a supercharger of a vehicle according to an exemplary embodiment in the present disclosure.

As shown in FIGS. 1 and 2, a method of controlling a supercharger of a vehicle according to an embodiment in the present disclosure includes: determining, by a controller 300 at a first determination step S100, whether or not an engine 10 operates in a cylinder deactivation (CDA) mode; calculating, by the controller 300 at a second determination step S200, a difference value between a target boost pressure of a turbocharger 150 based on a current running condition of the vehicle and a current boost pressure of intake air boosted by the turbocharger 150, and determining whether or not the difference value is equal to or greater than a reference difference value, when the engine 10 operates in the CDA mode; determining, by the controller 300 at a third determination step S300, based on a current operating condition of the engine whether or not the supercharger 200 is allowed to operate, when the difference value is equal to or greater than the reference difference value; determining, by the controller 300 at a fourth determination step S400, a target rpm of the supercharger 200, and determining whether or not the target rpm is equal to or greater than a reference rpm, when determining the supercharger 200 is allowed to operate; and operating the supercharger 200 based on the target rpm at step S500, when the target rpm is equal to or greater than the reference rpm.

Specifically, in the first determination step S100, the controller 300 determines whether or not the engine 10 operates in the CDA mode. The controller 300 may be an engine control unit (ECU) controlling the engine 10, or may be a separate controller 300 controlling the supercharger 200.

The controller 300 determines whether or not the engine 10 operates in the CDA mode. When the engine 10 operates in the CDA mode, some of several cylinders provided in the engine 10 are in an idle state. Therefore, injecting fuel is stopped and fuel efficiency increases.

However, in the CDA mode, the idle state cylinders do not generate exhaust gas having high pressure and temperature. Therefore, the volume and pressure of entire exhaust gas decreases in comparison with a normal operating condition of the engine 10.

In the second determination step S200, when the engine 10 operates in the CDA mode, the controller 300 calculates the difference value between the target boost pressure of the turbocharger 150 based on the current running condition of the vehicle and the current boost pressure of intake air boosted by the turbocharger. Next, the controller 300 determines whether or not the difference value is equal to or greater than the reference difference value.

As described above, when the engine 10 operates in the CDA mode, the volume and pressure of the entire exhaust gas may decrease in comparison with the normal operating condition of the engine 10. In the normal operating condition, combustion is generated in all cylinders provided in the engine 10. Therefore, due to the CDA mode of the engine 10, it is difficult to boost an intake air pressure of the turbocharger 150 driven by using kinetic energy of the exhaust gas.

Specifically, the turbocharger 150 obtains rotary power by the kinetic energy of the exhaust gas flowing in a turbine, and boosts the intake air pressure by using a compressor rotating with the turbine. In addition, in order to meet a boost pressure of intake air desired by the controller 300, a wastegate controlling the volume of exhaust gas flowing into the turbine, etc. may be provided in the turbocharger 150.

When the engine 10 operates in the CDA mode, rotation speed of the turbocharger 150 decreases due to a reduced volume of exhaust gas. The reduced volume of exhaust gas in the CDA mode is less than the volume of exhaust gas in the normal operating condition in spite of the same engine RPM. Therefore, in spite of the same control condition (engine RPM, etc.) of the engine 10, boosting the intake air pressure in the CDA mode is more difficult than that in the normal operating condition. Even though some of several cylinders are in an idle state during the CDA mode of the engine 10, intake air flows into the engine 10 as well as into the idle state cylinders. That is, an intake air volume in the CDA mode of the engine 10 is desired to be the same as an intake air volume flowing in all cylinders in the normal operating condition.

Accordingly, the method includes determining whether or not the difference value between the target boost pressure of the turbocharger 150 and the current boost pressure of intake air boosted by of the turbocharger 150, is equal to or greater than the reference difference value. The turbocharger 150 has a difficulty of boosting the intake air pressure due to the CDA mode of the engine 10. In addition, the method includes boosting the intake air pressure when the difference value is equal to or greater than the reference difference value.

As described below, the target boost pressure of the turbocharger 150 may be determined depending on a desired RPM of the engine 10 and on a desired intake air volume. An rpm of the turbocharger 150 is determined by controlling an opening ratio of the wastegate, etc. based on the target boost pressure.

In addition, as described below, the reference difference value is a criterion for determining whether or not the supercharger 200 is required to boost an intake air pressure. Namely, the criterion is used to determine that using the supercharger 200 is advantageous to boost the intake air pressure rather than controlling the turbocharger 150. The reference difference value may be variously determined in terms of strategically controlling the vehicle.

For example, the reference difference value may be a criterion for defining a condition that it is impossible to meet a boost pressure of intake air desired by the engine 10 with a current exhaust pressure, in spite of controlling the rpm of the turbocharger 150 such as controlling an opening ratio of the wastegate of the turbocharger 150, etc. Alternatively, the reference difference value may be a criterion for defining another condition that it is advantageous to boost an intake air pressure by operating the supercharger 200 rather than controlling the turbocharger 150.

In the third determination step S300, when the difference value is equal to or greater than the reference difference value, the controller 300 determines based on the current operating condition of the engine 10, whether or not the supercharger 200 is allowed to operate.

When the difference value is equal to or greater than the reference difference value, the controller 300 determines based on the current operating condition of the engine 10, whether or not the supercharger 200 is allowed to operate.

In order to determine whether or not the supercharger 200 is allowed to operate, as described below, the controller 300 may use both the current intake air volume and the limited rpm of the supercharger 200. That is, the controller 300 determines whether or not the supercharger 200 is allowed to operate at the third determination step S300.

In the fourth determination step S400, when based on the current operating condition of the engine 10, determining the supercharger 200 is allowed to operate, the controller 300 determines the target rpm of the supercharger 200. In addition, the controller 300 determines whether or not the target rpm is equal to or greater than the reference rpm.

When based on the current operating condition of the engine 10, determining the supercharger 200 is allowed to operate, the controller 300 calculates the target rpm of the supercharger 200. In addition, the controller 300 determines whether or not the target rpm is equal to or greater than the reference rpm, thereby determining whether the supercharger 200 is required to operate.

When the target rpm of the supercharger 200 is less than the reference rpm, operating the supercharger 200 is inefficient to meet a desired intake air volume of the engine 10.

That is, the reference rpm is a criterion for defining a condition that it is advantageous to boost an intake air pressure by operating the supercharger 200.

The reference rpm may be variously determined by using experimental or theoretical methods. For example, the reference rpm may be a criterion for defining a condition that it is inefficient to boost an intake air pressure by operating the supercharger 200 due to a slight boost of the intake air pressure with the supercharger 200.

The target rpm of the supercharger 200 may be determined by using various factors. For example, as described below, the target rpm may be determined by using the difference value between the target boost pressure of the turbocharger 150 and the current boost pressure of intake air boosted by the turbocharger 150.

That is, in the fourth determination step S400, whether or not operating the supercharger 200 is efficient to boost an intake air pressure is determined.

In an operating step S500, when the target rpm is equal to or greater than the reference rpm, the supercharger 200 is operated based on the target rpm.

In order to operate the supercharger 200, the controller 300 operates a driving source provided in the supercharger 200. In addition, a bypass channel 40 may be provided in the supercharger 200, and the controller 300 may control the bypass channel by turning on/off a valve thereof.

The bypass channel 40 of the supercharger 200 is a channel for bypassing intake air flowing into the engine 10 to prevent a flow resistance that caused by intake air passing the supercharger 200 during an idle state of the supercharger 200.

When the target rpm of the supercharger 200 is equal to or greater than the reference rpm, the controller 300 rotates the supercharger 200 at the target rpm. Therefore, the intake air pressure is boosted by both the turbocharger 150 and the supercharger 200, and meets a boost pressure of intake air desired by the engine 10.

That is, when the engine 10 operates in the CDA mode, based on the difference value between the target boost pressure (intake air pressure desired by engine 10) of the turbocharger 150 and the current boost pressure of intake air boosted by the turbocharger 150, the controller 300 determines whether or not the supercharger 200 is required to operate to boost the intake air pressure. The controller 300 determines based on the current operating condition of the engine 10, whether or not the supercharger 200 is allowed to operate. When determining the supercharger 200 is allowed to operate, the controller 300 determines whether or not the target rpm of the supercharger 200 is equal to or greater than the reference rpm, and determines whether or not it is advantageous to operate the supercharger 200. When determining it is advantageous to operate the supercharger 200, the controller operates both the turbocharger 150 and the supercharger 200 to boost the intake air pressure. Therefore, it is possible to effectively operate the engine 10 by meeting a desired intake air volume in spite of the CDA mode of the engine 10.

In the meantime, as shown in FIGS. 1 and 2, according to the exemplary embodiment in the present disclosure, the method of controlling the supercharger of the vehicle includes determining, by the controller 300 at the second determination step S200, the target boost pressure based on the desired engine rpm and the desired intake air volume.

The target boost pressure of the turbocharger 150 may be determined based on a desired intake air volume of the engine 10. To this end, the controller 300 determines the target boost pressure of the turbocharger 150 by using a desired engine rpm and a current intake air volume.

The target boost pressure may be determined based on both an amount of fuel injected by the engine 10 and the engine rpm. However, the method relates to a calculation of the target boost pressure in the CDA mode of the engine 10. Therefore, according to the present disclosure, in consideration of the idle state cylinders, the target boost pressure is calculated based on an intake air volume of an intake air flow line 20 rather than based on the amount of fuel injected by the engine 10.

Specifically, the controller 300 determines an intake air volume flowing to the engine 10 by using an opening ratio of a throttle valve or using a sensor, etc. In consideration of a current rpm of the engine 10 and current fuel consumption, the controller 300 determines a desired intake air volume of the engine 10 in the CDA mode of the engine 10. In order to meet the desired intake air volume of the engine 10, a target boost pressure of the turbocharger 150 at the intake air volume is determined.

Therefore, according to the present disclosure, in spite of the CDA mode of the engine 10 in which some cylinders are in an idle state, the target boost pressure of the turbocharger 150 is calculated such that a desired intake air volume flowing into the remaining cylinders is fully met.

Referring to FIGS. 1 and 2, according to the present disclosure, the method of controlling the supercharger of the vehicle includes that, in the third determination step S300, the controller 300 determines based on the current operating condition of the engine 10, whether or not the supercharger 200 is allowed to operate, by using both the current intake air volume and the limited rpm of the supercharger 200.

Specifically, as described above, in the second determination step S200, whether or not the supercharger 200 is allowed to operate is determined. That is, it is determined that when operating the supercharger 200 in case of exceeding the current intake air volume, whether or not a dangerous situation will happen, such as damage to the supercharger 200, etc., due to exceeding the limited rpm of the supercharger 200.

The limited rpm of the supercharger 200 is an rpm that can cause the damage to the supercharger 200. The limited rpm is preset. That is, according to the present disclosure, based on both the current intake air volume passing the supercharger 200 and the limited rpm, whether or not the supercharger 200 is allowed to stably operate is determined.

As shown in FIGS. 1 and 2, according to the present disclosure, the method of controlling the supercharger of the vehicle includes that in the fourth determination step S400, the controller 300 determines the target rpm of the supercharger 200 based on the current intake air volume, the intake air pressure of the supercharger 200, and the difference value between the target boost pressure and the current boost pressure.

Specifically, the controller 300 determines an intake air volume flowing to the supercharger 200, and determines an intake air pressure of the supercharger 200. The intake air pressure is measured by a sensor or by the controller 300 based on a driving condition of the turbocharger 150.

The target rpm of the supercharger 200 may be determined by applying the difference value the target boost pressure and the current boost pressure of the turbocharger 150 to the intake air pressure of the supercharger 200. The supercharger 200 boosts an intake air pressure of the current intake air volume to fully meet the target boost pressure.

That is, the intake air pressure is boosted by passing the turbocharger 150, and meets a desired intake air pressure of the engine 10 by passing the supercharger 200 operating at the target rpm. Therefore, the target boost pressure of the turbocharger 150 is met by operating both the turbocharger 150 and the supercharger 200.

As in FIGS. 1 and 2, according to the present disclosure, the method of controlling the supercharger of the vehicle further includes, after the first determination step S100, by the controller 300, increasing an opening ratio of an exhaust gas recirculation (EGR) valve 170 from a preset opening ratio of the EGR valve 170 when the engine 10 operates in the CDA mode at an increasing step S110.

As described above, when the engine 10 operates in the CDA mode, the volume or pressure of exhaust gas decreases. Consequently, it is possible to have an effect on an EGR system re-circulating some of the exhaust gas toward the intake air.

Specifically, the EGR system may be provided in various ways. According to the present disclosure, the EGR system re-circulates some of the exhaust gas toward the intake air by causing a flow of the exhaust gas by using a difference value between the exhaust gas pressure and the intake air pressure.

Here, when the exhaust gas pressure decreases due to the CDA mode of the engine 10, the difference value between the exhaust gas pressure and the intake air pressure also decreases such that the re-circulated exhaust gas volume decreases. As described above, in the CDA mode of the engine 10, injecting fuel into some of several cylinders is stopped; however, intake air still flows into the idle state cylinders. Therefore, an intake air condition in the CDA mode is desired to be the same as that in the normal operating condition of the engine 10.

That is, in spite of the CDA mode of the engine 10, a re-circulated exhaust gas volume in the CDA mode is desired to be the same as that in the normal operating condition in which all cylinders are injected with fuel. To this end, according to the present disclosure, the controller increases the opening ratio of the EGR valve 170 from a preset value when the engine operates in the CDA mode, thereby preventing the re-circulated exhaust gas volume from decreasing.

The preset value is an opening ratio of the EGR valve 170, which indicates a re-circulated exhaust gas volume in the normal operating condition in which all cylinders of the engine are injected with fuel. As described above, in the CDA mode of the engine 10, when operating the EGR system by applying the preset value, a re-circulated exhaust gas volume decreases. According to the present disclosure, the controller increases an opening ratio of the EGR valve 170 from the preset value when the engine 10 operates in the CDA mode, thereby preventing the re-circulated exhaust gas volume from decreasing in spite of the CDA mode of the engine 10.

The increased opening ratio of the EGR valve 170 may be theoretically and experimentally predetermined. In addition, in consideration of an engine rpm, an intake air volume, and etc., the increased opening ratio may be pre-stored in the controller 300 as a data map.

In the meantime, as shown in FIG. 2, according to the exemplary embodiment of the present invention, the system for controlling the supercharger of the vehicle includes: a turbocharger 150 provided on an intake air flow line 20 of an engine 10, and boosting pressure of intake air flowing into the engine 10; the supercharger 200 provided on the intake air flow line 20 at a location in a downstream of the turbocharger 150, and boosting the pressure of intake air flowing into the engine as an option; and a controller 300 determining whether or not the engine 10 operates in a cylinder deactivation (CDA) mode; calculating a difference value between a target boost pressure of the turbocharger 150 based on a current running condition of the vehicle and a current boost pressure of intake air boosted by the turbocharger, and determining whether or not the difference value is equal to or greater than a reference difference value, when the engine 10 operates in the CDA mode; determining based on a current operating condition of the engine 10, whether or not the supercharger 200 is allowed to operate, when the difference value is equal to or greater than the reference difference value; determining a target rpm of the supercharger 200, and determining whether or not the target rpm is equal to or greater than a reference rpm, when determining the supercharger 200 is allowed to operate based on the current operating condition of the engine 10; and operating the supercharger 200 based on the target rpm when the target rpm is equal to or greater than the reference rpm.

Specifically, the turbocharger 150 includes both a compressor that is provided on the intake air flow line 20 and compresses intake air, and a turbine, that is provided on an exhaust gas flow line 30 and rotates by an exhaust gas.

In addition, it is desirable that a compressor and a driving source are provided in the supercharger 200, wherein the compressor is provided on the intake air flow line 20 at a location in the downstream of the turbocharger 150, and the driving source rotates the compressor.

In the meantime, the controller 300 may be the ECU controlling the engine 10, or may be the separate controller transceiving information with the ECU. The controller 300 determines whether the engine 10 operates in the CDA mode, and calculates the difference value between the target boost pressure of the turbocharger 150 based on the current running condition of the vehicle and the current boost pressure of intake air boosted by the turbocharger 150.

In addition, when the difference value is equal to or greater than the reference difference value, the controller 300 determines based on the current operating condition of the engine 10, whether or not the supercharger 200 is allowed to operate. The controller 300 determines the target rpm of the supercharger 200, and determines whether or not the target rpm is equal to or greater than the reference rpm.

Moreover, when the target rpm is equal to or greater than the reference rpm, the controller 300 operates the supercharger 200 based on the target rpm.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A method for controlling a supercharger of a vehicle, the method comprising:
    determining, by a controller at a first determination step, whether or not an engine operates in a cylinder deactivation (CDA) mode;
    calculating, by the controller at a second determination step, a difference value between a target boost pressure of a turbocharger based on a current running condition of the vehicle and a current boost pressure of intake air boosted by the turbocharger, and determining whether or not the difference value is equal to or greater than a reference difference value, when the engine operates in the CDA mode;
    determining, by the controller at a third determination step, based on a current operating condition of the engine, whether or not the supercharger is allowed to operate, when the difference value is equal to or greater than the reference difference value;
    determining, by the controller at a fourth determination step, a target rpm of the supercharger, and determining whether or not the target rpm is equal to or greater than a reference rpm, when determining the supercharger is allowed to operate; and
    operating the supercharger based on the target rpm when the target rpm is equal to or greater than the reference rpm.

2. The method of claim 1, wherein in the second determination step, the controller determines the target boost pressure based on a desired engine rpm and a desired intake air volume.

3. The method of claim 1, wherein in the third determination step, the controller determines based on the current operating condition of the engine, whether or not the supercharger is allowed to operate, by using both a current intake air volume and a limited rpm of the supercharger.

4. The method of claim 1, wherein in the fourth determination step, the controller determines the target rpm of the supercharger based on an intake air pressure and a current intake air volume of the supercharger, and the difference value between the target boost pressure and the current boost pressure of intake air boosted by the turbocharger.

5. The method of claim 1, further comprising: after the first determination step, increasing, by the controller, an opening ratio of an exhaust gas recirculation (EGR) valve from a preset value when the engine operates in the CDA mode.

6. A system for controlling a supercharger of a vehicle, the system comprising:
    a turbocharger provided on an intake air flow line of an engine, the turbocharger boosting pressure of intake air flowing into the engine;
    the supercharger provided on the intake air flow line at a location in a downstream of the turbocharger, and boosting the pressure of intake air flowing into the engine as an option; and
    a controller configured to:
        determine whether or not the engine operates in a cylinder deactivation (CDA) mode;
        calculate a difference value between a target boost pressure of the turbocharger based on a current running condition of the vehicle and a current boost pressure of intake air boosted by the turbocharger;
        determine whether or not the difference value is equal to or greater than a reference difference value, when the engine operates in the CDA mode;
        determine based on a current operating condition of the engine, whether or not the supercharger is allowed to operate, when the difference value is equal to or greater than the reference difference value;
        determine a target rpm of the supercharger, determine whether or not the target rpm is equal to or greater than a reference rpm, when determining the supercharger is allowed to operate; and
        operate the supercharger based on the target rpm when the target rpm is equal to or greater than the reference rpm.

* * * * *